(12) United States Patent
Kiefaber et al.

(10) Patent No.: US 10,940,794 B2
(45) Date of Patent: Mar. 9, 2021

(54) METHOD AND APPARATUS FOR VEHICLE BRAKING SIGNAL

(71) Applicants: Benjamin Markley Kiefaber, Ridgefield, CT (US); Bradley Crawford Kiefaber, Ridgefield, CT (US)

(72) Inventors: Benjamin Markley Kiefaber, Ridgefield, CT (US); Bradley Crawford Kiefaber, Ridgefield, CT (US)

(*) Notice: Subject to any disclaimer, the term of this patent is extended or adjusted under 35 U.S.C. 154(b) by 0 days.

(21) Appl. No.: 16/429,984

(22) Filed: Jun. 3, 2019

(65) Prior Publication Data

US 2019/0366915 A1 Dec. 5, 2019

Related U.S. Application Data

(60) Provisional application No. 62/679,853, filed on Jun. 3, 2018.

(51) Int. Cl.
*B60Q 1/44* (2006.01)
*B60Q 1/26* (2006.01)
*B60Q 1/30* (2006.01)

(52) U.S. Cl.
CPC ........... *B60Q 1/444* (2013.01); *B60Q 1/2607* (2013.01); *B60Q 1/2611* (2013.01); *B60Q 1/2696* (2013.01); *B60Q 1/30* (2013.01)

(58) Field of Classification Search
CPC .... B60Q 1/444; B60Q 1/2607; B60Q 1/2696; B60Q 1/30; B60Q 1/2611; B60Q 1/441; B60Q 1/44; B60Q 1/302; B60Q 1/447; B60Q 1/46; B60Q 1/503; B60Q 1/52; B60Q 2400/20; B60T 17/22; B60T 7/042; B60T 2220/04
USPC .................. 340/479, 471, 468, 464, 463
See application file for complete search history.

(56) References Cited

U.S. PATENT DOCUMENTS

| | | | | |
|---|---|---|---|---|
| 5,289,134 A * | 2/1994 | Kohr | ...................... | G01R 31/54 324/714 |
| 6,163,256 A | 12/2000 | Brown | | |
| 6,573,830 B2 * | 6/2003 | Cohen | ................... | B60Q 1/444 340/463 |
| 9,561,748 B2 | 2/2017 | Bingle | | |
| 2008/0238648 A1 * | 10/2008 | Tewari | ................... | B60Q 1/444 340/469 |
| 2008/0309478 A1 * | 12/2008 | Morales | ................ | B60Q 1/444 340/467 |
| 2010/0085180 A1 | 4/2010 | Mathis | | |
| 2014/0253315 A1 * | 9/2014 | Bement | .................. | B60Q 1/447 340/479 |

(Continued)

OTHER PUBLICATIONS

NACTO, "Vehicle Stopping Distance and Time", (https://natco.org/wp-content/uploads/2015/04/vehicle_stopping_distance_and_time_upenn.pdf), National Association of City Transportation Officials, University of Pennsylvania School of Engineering, Philadelphia, PA, accessed Sep. 17, 2013 (4 pages).

(Continued)

*Primary Examiner* — Anh V La
(74) *Attorney, Agent, or Firm* — Wilmer Cutler Pickering Hale and Dorr LLP

(57) ABSTRACT

Systems and methods for vehicle braking signals are described herein. In some embodiments, the system and methods improve the brake lights on automobiles.

15 Claims, 8 Drawing Sheets

(56) References Cited

U.S. PATENT DOCUMENTS

2015/0137965 A1* 5/2015 Lanham ............... B60Q 1/2607
340/479
2017/0190283 A1* 7/2017 Ding ..................... B60Q 1/444

OTHER PUBLICATIONS

NHTSA, "The Economic and Societal Impact of Motor Vehicle Crashes, 2010 (Revised)", U.S. Department of Transportation National Highway Traffic Safety Administration, DOT HS 812 013, May 2015 (304 pages).

NTSB, "Special Investigation Report: The Use of Forward Collision Avoidance Systems to Prevent and Mitigate Rear-End Crashes", National Transportation Safety Board, NTSB/SIR-15/01, PB2015-104098 , 2015 (63 pages).

World Health Organization, Fact Sheet: "Road traffic injuries: the facts", from "Global status report on road safety 2013", www.who.int/violence_injury_prevention/road_safety_status, 2013 (1 page).

* cited by examiner

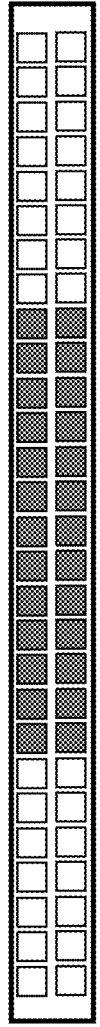
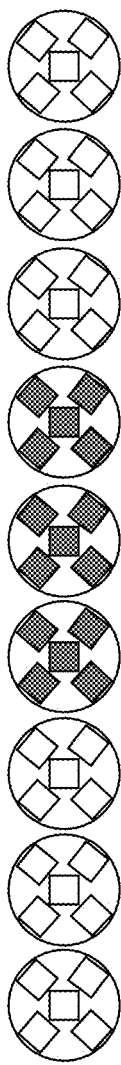
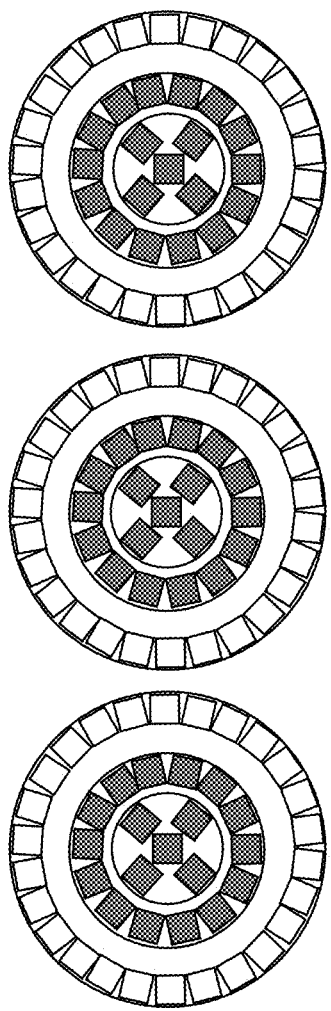
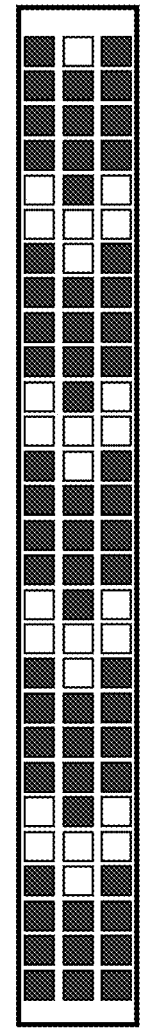
FIG. 3A  FIG. 3B  FIG. 3C  FIG. 3D  FIG. 3E  FIG. 3F
FIGS. 3A-3F

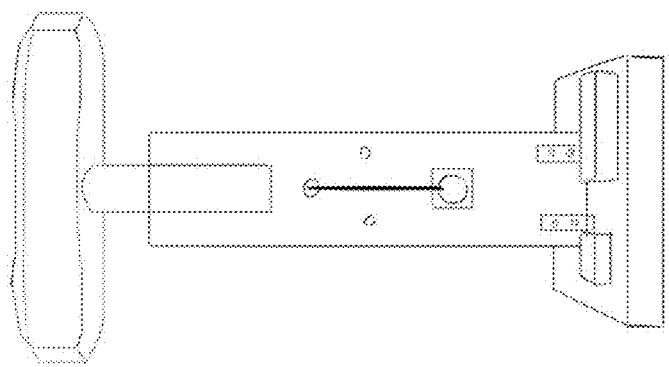
FIG. 7C
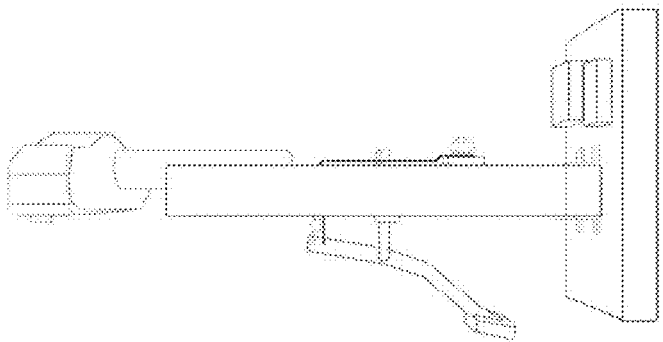
FIG. 7B
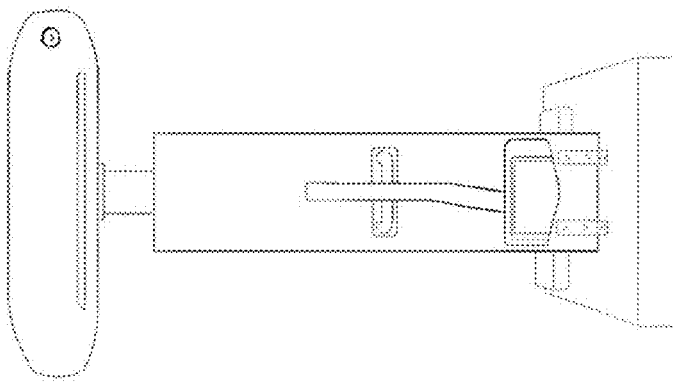
FIG. 7A
FIGS. 7A-7C

FIG. 8A
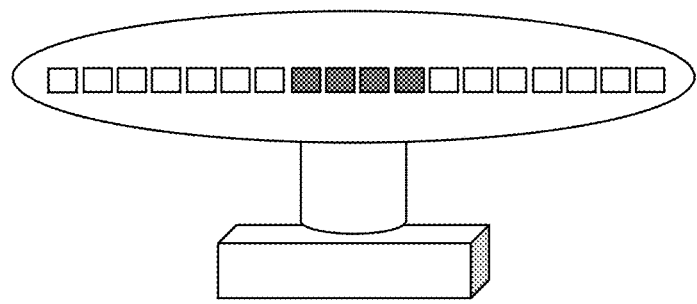
FIG. 8B
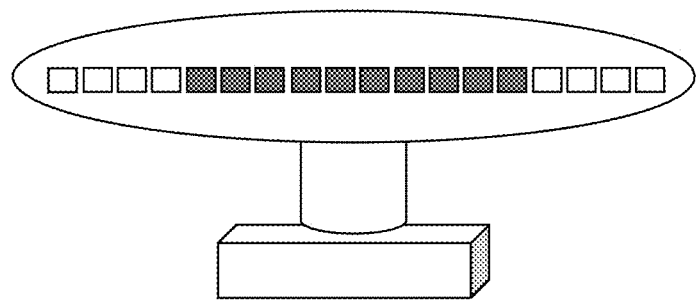
FIG. 8C
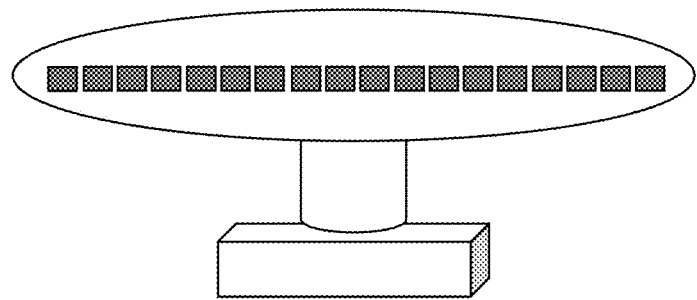
FIGS. 8A-8C

METHOD AND APPARATUS FOR VEHICLE BRAKING SIGNAL

CROSS-REFERENCE TO RELATED APPLICATIONS

This application claims the benefit of and priority to U.S. provisional patent application Ser. No. 62/679,853, filed Jun. 3, 2018, titled "Rear-Ender Defender", the disclosure of which is hereby incorporated by reference in its entirety for all purposes.

All publications, patent applications, patents, and other references mentioned herein are incorporated by reference in their entirety. In the case of inconsistencies, the present disclosure will prevail.

FIELD OF THE INVENTION

The invention relates to apparatuses and methods for vehicle braking signals. This present disclosure relates to a system and methods to improve the brake lights on automobiles.

BACKGROUND

Rear-end collisions make up 48% of all accidents between two vehicles and approximately 500,000 people are injured while 1,700 people are killed in rear-end accidents in the United States each year. (NTSB (National Transportation Safety Board) 2015 Special Investigation Report: The Use of Forward Collision Avoidance Systems to Prevent and Mitigate Rear-End Crashes; NHTSA (National Highway Traffic Safety Administration) 2015 The Economic and Societal Impact of Motor Vehicle Crashes, 2010 (Revised); each herein incorporated by reference in its entirety.) The toll of automobile accidents is even greater world-wide as the World Health Organization estimates that approximately 1.24 million people die in road crashes every year and over 80% of all road fatalities occur in low to middle-income countries. (WHO (World Health Organization) 2013 Infographics on global road safety 2013; herein incorporated by reference in its entirety.)

All motorized vehicles that are legally permitted to travel on roads are equipped with rear brake lights to alert other drivers when a vehicle is slowing down or coming to a stop. The brake lights are activated via a switch activated by the brake pedal and when the driver presses the brake pedal the rear brake lights illuminate. Originally, there were two rear brake lights on a car, which were situated on the left and right sides of the chassis. In 1986, the US mandated that all cars sold in the US must have a third brake light that is located in the center of the car. This third brake light is placed higher on the chassis than the other two main brake lights.

BRIEF SUMMARY OF THE INVENTION

The current brake light configurations are inadequate to fully prevent rear-end automobile accidents as evidenced by the great number of accidents still occurring (approximately 1.7 million annually in the United States according to the NTSB). The current brake lights on the market do not let other drivers know how hard other drivers in front of them are depressing the brake pedal, which means that the drivers behind a slowing vehicle do not know how quickly the other vehicle is stopping. Further, the current brake lights do not give an indication if the car in front of a driver is stopped or slowing down since the brake lights are either fully illuminated or turned off completely. Further, it is possible that drivers have become used to the current brake light configurations so that drivers are less aware of slowing or stopped cars.

Thus, Applicants have recognized that there remains a need for brake light configurations to alert drivers and assist in the prevention of automobile accidents. Applicants have also recognized that there further remains a need for brake light configurations to signal relative deceleration rates.

The method and system described herein center around a novel concept where a series of programmable LEDs situated in the third brake light can be illuminated and flash in sequence as the brake pedal in a vehicle is depressed. The number of LEDs that are illuminated is determined by how far the brake pedal has moved from its original position, and when the brake pedal is fully pressed, all of the LEDs are lit. In certain embodiments, the LEDs can flash. In certain embodiments, all of the LEDs can flash when maximum braking condition or braking pressure is exerted.

The present disclosure provides an improvement to the third (center) brake light as it shows how hard a driver is pressing the brake pedal by illuminating a series of programmable LEDs. The harder the brake pedal is depressed; the more LEDs will be illuminated and vice versa. The present disclosure will allow providing alerts to other drivers that a car is slowing quickly or has come to a complete stop as all of the LEDs will be illuminated. In certain embodiments, the LEDs will also flash in an intermittent manner. In certain embodiments, all of the LEDs can flash when maximum braking condition or braking pressure is exhibited. The present disclosure will enable the progressive illumination and flashing LEDs that may help to get the attention of drivers to the rear of the slowing/stopping vehicle, especially if they happen to be distracted. Finally, the present disclosure provides a car manufacturer the ability to customize the computer code, enabling the car manufacturer to calibrate the illumination of the LEDs for their vehicles' braking system as well as enabling the manufacturer to set up different flashing patterns or colors. This flexibility facilitates the use of the apparatus in emergency and commercial vehicles.

In one aspect, an apparatus is provided comprising: (a) a brake pedal; (b) a brake pedal depression measurement device operatively connected to the brake pedal; (c) a light emitting device comprising a plurality of programmable lights; (d) a microcontroller operatively connected to the light emitting device and the brake pedal depression measurement device; and (e) a power source operatively connected to the microcontroller and the light emitting device; wherein the microcontroller is configured to receive an input from the brake pedal depression measurement device regarding the braking condition and determine the specific one or more programmable lights to be illuminated in response thereto; and wherein the microcontroller is configured to flash the specific one or more of the plurality of programmable lights or the microcontroller is configured to illuminate the plurality of programmable lights to spell out a warning message.

In some embodiments, the light emitting device comprises a plurality of programmable light emitting diodes.

In some embodiments, the brake pedal depression measurement device is a potentiometer.

In some embodiments, the microcontroller receives an electrical resistance from the potentiometer as the input.

In some embodiments, the output of the potentiometer is divided into different electrical resistance buckets indicative of the amount of braking pressure applied to the brake pedal.

In another aspect, a braking system is provided comprising: (a) a brake pedal; (b) a light emitting device comprising a plurality of programmable lights; (c) a microcontroller operatively connected to the light emitting device and the brake pedal depression measurement device; and (d) a power source operatively connected to the microcontroller and the light emitting device; wherein the microcontroller is configured to: (i) receive information regarding (1) whether the brake pedal has been depressed, (2) the current speed of the vehicle, and (3) the current rate of deceleration of the vehicle; and (ii) provide instructions to the light emitting device to illuminate specific one or more of the plurality of programmable lights depending on predetermined conditions of the current speed of the vehicle and the current rate of deceleration of the vehicle when the brake pedal has been depressed.

In some embodiments, the microcontroller is configured to provide instruction to the light emitting device to illuminate all of the plurality of the programmable lights if the current speed of the vehicle is near zero when the brake pedal has been depressed.

In some embodiments, the microcontroller is configured to provide instruction to the light emitting device to illuminate all of the plurality of the programmable lights if the current speed of the vehicle is below a predetermined speed value or if the current rate of deceleration is above a predetermined deceleration rate value when the brake pedal has been depressed.

In some embodiments, the microcontroller is configured to provide instruction to the light emitting device to illuminate specific one or more of the plurality of the programmable lights when the current speed of the vehicle is above a predetermined speed value or the current rate of deceleration is below a predetermined deceleration rate value when the brake pedal has been depressed.

In some embodiments, the light emitting device comprises a plurality of programmable light emitting diodes.

BRIEF DESCRIPTION OF THE DRAWINGS

The following figures are illustrative only and are not intended to be limiting.

FIGS. 3A-3F show illustrative embodiments of possible LED configurations including (A) multiple rows, (B) different colors as brake pedal pressure is increased or decreased, (C) circular lights, (D) concentric circular lights, (E) emergency vehicle, and (F) emergency vehicle directional lights.

FIGS. 7A-7C show pictures of a prototype of a configuration according to an illustrative embodiment including front view (FIG. 7A), side view (FIG. 7B), and rear view (FIG. 7C).

FIGS. 8A-8C show the illumination pattern of a third brake light configuration according to an illustrative embodiment including a small number of LEDs illuminated (FIG. 8A), a moderate number of LEDs illuminated (FIG. 8B), and maximum number of LEDs illuminated (FIG. 8C).

DETAILED DESCRIPTION

Figure 1:
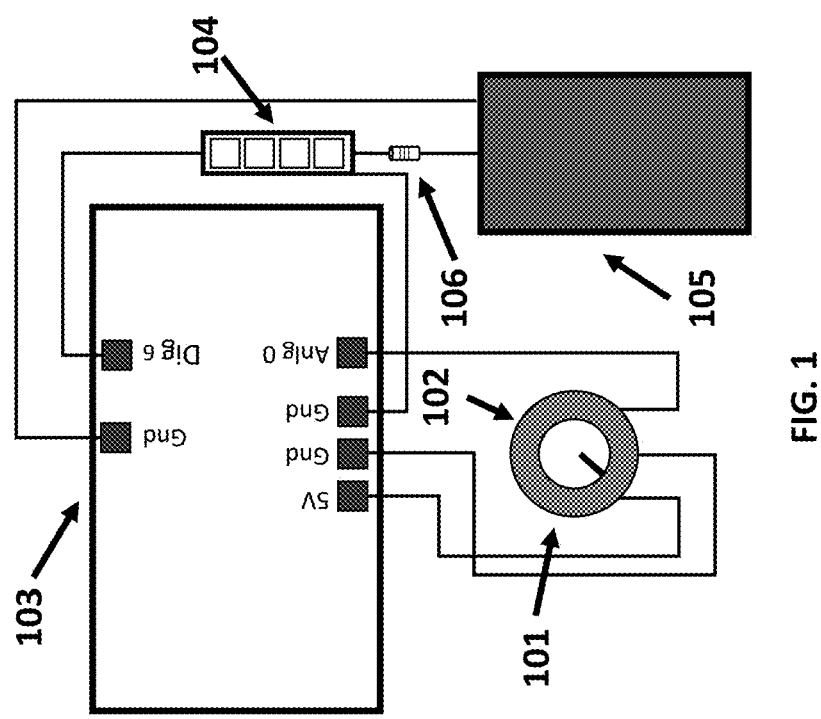
FIG. 1 shows an illustrative embodiment of a configuration of the braking system. This configuration is similar to what was implemented for a prototype.

As used herein and in the appended claims, the singular forms "a," "an," and "the" include plural references unless the content clearly dictates otherwise.

The term "about" is used herein to mean approximately, in the region of, roughly, or around. When the term "about" is used in conjunction with a numerical range, it modifies that range by extending the boundaries above and below the numerical values set forth. The present disclosure replaces the current third (center) brake light found on most cars that have been manufactured in the United States since 1986 and worldwide since 1998. Specifically, a novel brake light configuration, which lights up a progressive number of lights, such as LED (Light Emitting Diode) lights, to show how much the driver has depressed the brake pedal, is provided. In some embodiments, when the brake pedal is fully depressed, all of the brake light's LEDs are lit. In some embodiments, when the brake pedal is fully depressed, the lights can flash in a periodic sequence. In certain embodiments, all of the lights can flash when maximum braking condition or braking pressure is exhibited. In some embodiments, as the driver releases the brake pedal, the LED lights will turn off in a progressive manner, reversing the order they were illuminated. The software can determine how many of the LEDs light up, depending on how much the brake pedal is depressed. This present disclosure is not limited to being implemented on the third (center) brake light and could be used for all brake lights on a vehicle. Further, the present disclosure can be applied to other motorized vehicles that have rear brake lights, such as trucks, recreational vehicles, motorcycles, scooters, etc. Further, due to the programmability of the LEDs and the flexibility of the custom written software, the present disclosure can be implemented with different configurations to illuminate and flash the LEDs, including in a different progression order, as well as flash the LEDs in different intervals. Finally, because some programmable LEDs can illuminate the full spectrum of colors other than red, this provides flexibility to use a combination of colors to denote a slowly decelerating vehicle (e.g., some LEDs are amber while some are red) or a vehicle that is stopping quickly (e.g., all red LEDs). Further, the variation of colors and ability to program various flashing patters also permits the third brake light to be used in emergency vehicles when their primary overhead emergency lights are flashing, or in construction or commercial vehicles to warn motorists.

The apparatus can be provided with at least the following five components: (1) connection to a brake pedal, (2) brake pedal depression measurement device, (3) microcontroller or processor, (4) light emitting device; and (5) a power source. The present disclosure advances the art of brake light systems through the novel integration of at least these components, among other components that can be found in automotive vehicles. In some embodiments a switch can allow the user to turn the brake light into emergency mode.

An exemplary schematic embodiment is presented in FIG. 1 showing the connection between the brake pedal (101) and brake pedal depression measurement device (102), microcontroller or processor (103) (e.g., Arduino microcontroller), light emitting device (104) (e.g., Neopixel LED strip), and a power source (105). Additional components can be further utilized as part of the braking system. For example, a resistor (106) (e.g., 330Ω) between the power source and the light emitting device is shown in FIG. 1. Additionally, the programmable controller could be connected to the car's central computer to receive information about the car's speed, deceleration, etc.

Brake Pedal:

Different types of brake pedals exist and are well-known to one skilled in the art. Exemplary brake pedal configurations can include a brake arm secured to the pedal, which actuates when the brake pedal is depressed. In some embodiments, when the brake pedal is depressed, it forces the brake arm to push against a piston in the master cylinder which pushes the brake fluid along the brake lines to actuate pistons at the brakes at each wheel. In most modern automobiles there are twin hydraulic circuits with two master cylinders in order to provide redundancy. A brake arm can be attached to a brake pedal measurement device. In certain embodiments, the brake pedal is connected to a wire that is connected to a brake pedal depression measurement device.

Brake Pedal Depression Measurement Device:

The brake pedal in the vehicle can be connected to a device that measures the amount of depression of the brake pedal. Exemplary devices that can measure the amount of depression of the brake pedal include potentiometers (e.g., a WGCD PlayStation joystick for Arduino), transducers, pressure sensors, and strain gauge sensors (e.g., as in U.S. Pat. No. 6,163,256; herein incorporated by reference in its entirety), and the like. In some embodiments, it is possible that an automobile may already have a brake pedal measurement device that is connected to the car's central computer. The connection between the brake pedal and the brake pedal depression measurement device can be carried out in any suitable methods, such as via a flexible wire, brake hose, or the like. Strain gauge sensors can sense brake pressure by expansion of a flexible brake hose when the brake pedal is depressed. The device can further comprise one or more amplifiers to amplify output when the brake pedal is depressed.

In certain embodiments, the brake pedal can be connected to a potentiometer. A potentiometer is an electronic component that produces variable resistance to an electric current. A potentiometer can provide a full range of resistance from 0 ohms to the maximum resistance level specified for the potentiometer. The potentiometer can move along a linear axis and can be spring loaded, similar to what is used for video game joystick controllers. As the brake pedal is depressed, it can move the potentiometer, which in turn can provide a varied resistance to the electric current running through it. When the brake pedal is released, the potentiometer can return back to the original resting position. The potentiometer can be connected to the brake pedal as well as a programmable microcontroller or processor.

Figure 4:
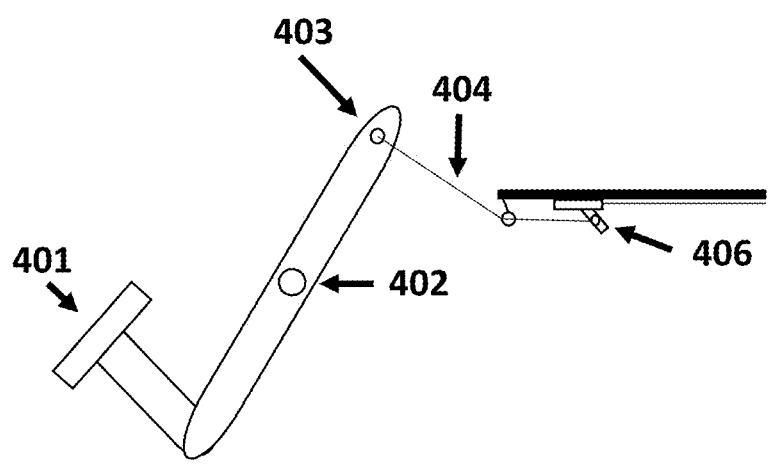
FIG. 4 shows an illustrative embodiment of a brake pedal attached to a potentiometer that can move along an axis to produce different levels of resistance.

FIG. 4 shows an exemplary configuration of how the potentiometer moves in relation to the driver pressing the brake pedal. As the driver presses the brake pedal (401), the brake pedal can rotate upon its pivot point (402) and the top arm of the brake pedal assembly (403) can begin to move forward. A flexible wire (404) can be attached to the top of the brake pedal assembly (403) and as the brake pedal (401) is depressed, the wire can be pulled forward. The wire can be routed through an eye (405) in order to change the direction of the pulling force. The wire can be ultimately connected to a potentiometer (406) that moves along an axis. The potentiometer in this diagram can be spring loaded such that when the brake pedal is not depressed, the potentiometer lever is at a resting state. When the potentiometer moves, it can produce changes in the electrical resistance and the electrical resistance can be read by the microcontroller or processor. There could be several methods to connect the brake pedal to the potentiometer and the scope of this application is not limited to the embodiment shown in the diagram. Further, each vehicle may have a different brake pedal system configuration and the scope of this patent is not limited to the brake pedal design shown in this diagram.

Microcontroller or Processor:

A microcontroller or processor is programmable and has the capability to receive one or more analog or digital electrical signal inputs, run program logic based upon the inputs and then transmit one or more digital or analog electrical output signals. In certain embodiments, the microcontroller or processor will continuously run the program to read the input signal(s) and generate the desired output signal(s). Given the large variety of input and output devices along with the vast diversity of programming logic, microcontrollers can be configured to perform a vast number functions. In certain embodiments, a microcontroller or a processor can run computer programming code to determine brake pedal depression and send instructions to illuminate lights. The microcontroller or processor can read output from the brake pedal depression measurement device and/or from a pre-existing computer within the vehicle and send instructions to the light emitting device. In certain embodiments, the programmable microcontroller or processor can run one or more segments of computer program code to continuously determine how much the brake pedal has been depressed, such as by reading the output from the brake pedal depression measurement device. The microcontroller can be programed, e.g., to instruct the rate and/or intensity of light illumination, the number of lights illuminated, the color of the lights illuminated, alternate illumination patters, and/or flashing, based on the level of brake pedal depression. The microcontroller can have one or more input and/or output pins depending on the processes to be controlled.

FIG. 1 shows a microcontroller or a processor with multiple input and output pins. However, as would be readily apparent to one skilled in the art, the microcontroller or processor can have only one input pin and one output pin. In certain embodiments, a separate dedicated microcontroller or processor may not be needed for some vehicles. For example, if the current computer system contained within the vehicle can act as a microcontroller or processor that controls the braking system and has ability to read inputs and send an output to the light emitting device, the vehicle's computer system can be utilized. In certain embodiments, the microcontroller can be connected to the light emitting device via one of the microcontroller's output pins.

In certain embodiments, as described above, a potentiometer can be utilized as the brake pedal depression measurement device. As shown in FIG. 1, the potentiometer can be connected to the input pins of the microcontroller. In this embodiment, the microcontroller or processor can receive the varying resistance levels from the potentiometer in response to the amount the brake pedal has been pressed. In certain embodiments, the programmable microcontroller or processor can run one or more segments of computer program code to continuously read the resistance level from the brake pedal depression measurement device. The microcontroller or processor can be utilized to divide the full range of resistance specified by the brake pedal depression measurement device into buckets or groups. For example, the full range of resistance specified by the brake pedal depression measurement device can be equally divided into buckets or groups within the program.

The microcontroller or processor can also other send instructions to the LED lights such as creating different illumination patterns (e.g., progressive lights going from left to right) or causing the light emitting device to light up in a variety of colors (e.g., flashing blue).

Light Emitting Device:

In certain embodiments, the microcontroller or processor can be connected to a light emitting device. In certain embodiments, the light emitting device can indicate how much the brake pedal has been pressed. Some exemplary light emitting devices include light bulbs such as incandescent bulbs, Light Emitting Diodes (LEDs), filament lamps, and gas discharge lamps such as halogen lamps. In certain embodiments, the light emitting device can be provided as a series of individually programmable lights. In certain embodiments, the light emitting device can be provided as a programmable LED strip, such as the Adafruit NeoPixel strip, which allows each light in the eight LED strip to be individually controlled. In some embodiments, in addition to illuminating each LED light in a programmable strip individually, each LED can be illuminated using a variety of program defined colors.

In certain embodiments, the light emitting device can be provided as the third or middle brake light of the conventional three-light braking system. In certain embodiments, the light emitting device can be provided as the first or second (e.g., left or right) brake lights of the conventional three-light braking system. In other embodiments, the light emitting device can be provided as different parts of a multi-light braking system.

Taking a particular exemplary embodiment of a light emitting device being provided with a series of individual programmable LED lights, a program within the microcontroller or processor can determine how many LEDs there are and each LED can be "registered" with the microcontroller or processor. As described above, the microcontroller can determine the number of LEDs to light and the microcontroller or processor can send the instructions to the LED strip to turn on/turn off individual LED lights. The program can specify how many LEDs to light in a group. In certain embodiments, the LEDs can illuminate in groups originating from the center of the third brake light moving out to the outside. Alternatively, in certain embodiments the LEDs can illuminate in groups from the outside towards the center of the third brake light. In certain embodiments, when the brake is fully depressed, the LEDs can flash and the flashing of the LEDs is accomplished by turning the LEDs on and off in a rapid manner. The number of LEDs and flashing pattern can be configured by the program code in the microcontroller or microprocessor. As some programmable light emitting devices can illuminate different colors, in some embodiments of the third brake light, as the lights illuminate from the center to the outside, different colors can be used. For example, the outer lights can be amber or orange, while the inner lights are red. Also, because the microcontroller can send alternative illumination patterns to the programmable LED lights, this invention can be particularly useful for emergency vehicles. In some embodiments, the programmable LED lights could illuminate using the same color (e.g., blue) and pattern as the vehicle's other emergency lights. In some embodiments, the lights could illuminate in succession from one side of the emergency vehicle to the other to warn other cars that the vehicle is stopped, and the other cars should proceed around the emergency vehicle.

As discussed above, the microcontroller or processor can be utilized to divide the full range of amount of brake pedal movement specified by the brake pedal depression measurement device into different buckets. In certain embodiments, each resistance bucket can correspond to the number of LEDs to illuminate. For example, if the brake measurement device is a potentiometer and if the potentiometer has a minimum resistance of 0Ω and a maximum resistance of 600Ω, the resistance could be split into seven equal buckets of 100Ω each. If the LED Strip had 24 LEDs then the program could decide to illuminate 4 LEDS for each 100Ω bucket. Table 1 below shows an exemplary embodiment of how many LEDS the program would decide to illuminate based upon different potentiometer resistance levels.

TABLE 1

| Determination of LEDs by Resistance. | |
|---|---|
| Resistance Bucket | LEDs to Illuminate |
| 0Ω | 0 |
| 1Ω-100Ω | 4 |
| 101Ω-200Ω | 8 |
| 201Ω-300Ω | 12 |
| 301Ω-400Ω | 16 |
| 401Ω-500Ω | 20 |
| 501Ω-600Ω | 24 and flash |

Alternatively, if a pre-existing computer within the vehicle can determine whether the brake is depressed, the current speed and/or rate of deceleration of the vehicle, such information can be utilized to determine the number of LEDs to illuminate and/or flash. If the vehicle is decelerating quickly and/or is at a stop and the brake is depressed, the microcontroller could send the signal to illuminate one or more, including all, of the LED lights and/or flash them periodically. A professional driver on a closed course can achieve deceleration rates of 32 feet/second$^2$ while a reasonably skilled driver could easily achieve deceleration rates in excess of 20 feet/second$^2$ (National Association of City Transportation Officials Vehicle Stopping Distance and Time; herein incorporated by reference in its entirety.) Table 2 shows one exemplary embodiment of how many LED lights, out of 24 total, could be illuminated given a rate of deceleration, specified as the variable "x".

TABLE 2

| Determination of LEDs by deceleration | |
|---|---|
| Deceleration rate x (feet/second$^2$) | LEDs to Illuminate |
| x = 0 | 0 |
| 0 < x < 4 | 4 |
| 4 < x < 8 | 8 |
| 8 < x < 12 | 12 |
| 12 < x < 16 | 16 |
| 16 < x < 20 | 20 |
| x > 20 | 24 and flash; or brake is applied and speed is 0 mph |

Figure 2:
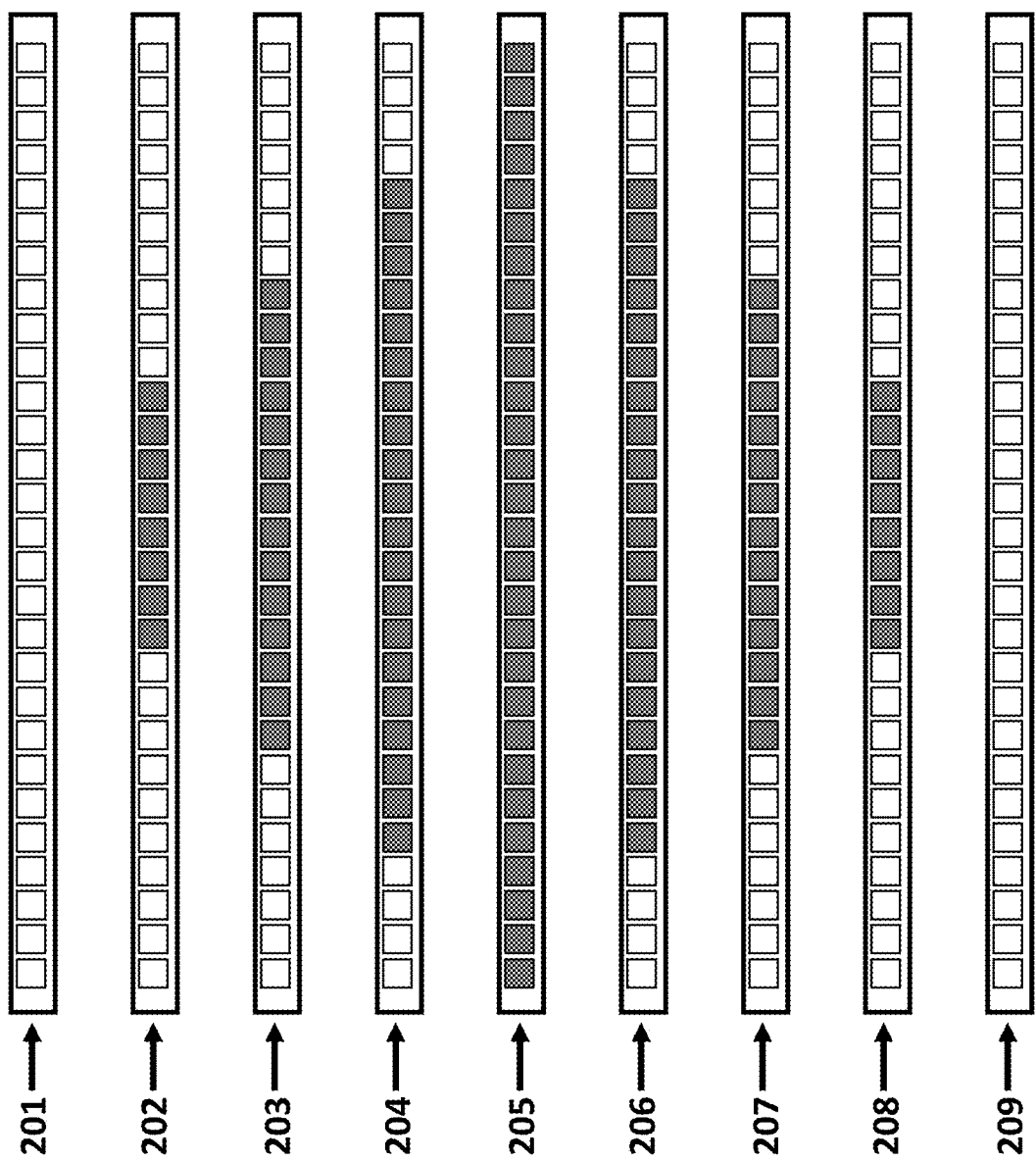
FIG. 2 shows an illustrative embodiment of a configuration of programmable LED strips with a possible lighting progression.

FIG. 2 shows another exemplary embodiment of different types of illumination configurations that can be displayed by the programmable LEDs. In certain embodiments, the programmable LEDs can be provided in the third (or middle)

brake light. The number of LEDs illuminated by the microcontroller can depend upon how hard the brake pedal is depressed. For example, in the "resting state" when the brake pedal is not pressed, none of the LED lights are illuminated (201). When the driver of the vehicle begins to depress the brake pedal, partial lights (e.g., four of the LEDs) can be illuminated (202). As the driver continues to depress the pedal, additional partial lights (e.g., eight of the lights) can be illuminated (203) and as the brake pedal continues to be further pressed, yet additional partial lights (e.g., twelve of the lights) can be illuminated (204). When the brake pedal is fully depressed, all of the LED lights can be illuminated. In certain embodiments, when the brake pedal is fully depressed, all of the LED lights can flash (205). As the driver begins to release the brake such that it returns to its resting state, the lights can be turned off in the reverse order they were lit. For example, when the break pedal is partially released partial lights can be illuminated (206). As the break pedal is further released, fewer lights can be illuminated (207). As the break pedal continues toward its resting state, even fewer lights can be illuminated (208) until the break pedal is in its resting state in which no lights are illuminated (209).

As will be readily apparent to one skilled in the art, any different number of LEDs can be utilized, any different grouping of partial LEDs to light up, and any different flashing pattern described above can be utilized. Exemplary configurations are shown in FIGS. 3A-3F. In certain embodiments, the LED lights can be provided as a strip of LED lights. The programmable LED lights can either be one long light strip or multiple light strips combined together. In certain embodiments strips of LEDs could be stacked such that there are multiple rows of LEDs (FIG. 3A). In certain embodiments, the LED lights can be provided in a particular pattern that illustrates the amount the brake pedal has been pressed. For example, when maximum braking conditions is exhibited, the plurality of LED lights can be illuminated in a manner that spells out the word "STOP" or "CAUTION" or any other equivalent. In certain embodiments, all of the LEDs or the LEDs that spell out the word "STOP" or "CAUTION" or any other equivalent can flash when maximum braking condition is exhibited. In certain embodiments, the LED lights can be provided with different colors, such as different grades of red color depending on how much the brake pedal has been pressed. Alternatively, other colors such as amber could signify that the vehicle is slowing gradually while red LED lights constitute a faster braking pattern (FIG. 3B). In certain embodiments, the LED lights can be provided in geometric patterns (e.g., linear, cross, circular, concentric circles or ovals) and programed to progressively illuminate starting from the interior of the pattern. For example, LEDs in a linear circular pattern can progressively illuminate starting from the interior of the pattern (FIG. 3C). LEDs in a concentric circle pattern can be programmed to illuminate starting from the smallest circle of LEDs and propagate outwardly (FIG. 3D). In certain embodiments, the LEDs could be used in emergency vehicles and flash in different colors and sequences to match the overhead emergency lights when they are illuminated (FIG. 3E). In some embodiments, the LEDs could illuminate from one side of the third brake light to the other to alert other drivers that the emergency, commercial or construction vehicle is stopped and the other motorists should proceed around stopped vehicle by following the illuminated path of LEDs (FIG. 3F).

Power Source:

A power source that provides power to the braking system can be provided. In particular, a power source can be utilized to operate the microcontroller or processor described above. As another example, a power source can be utilized to operate the light emitting device described above. A wide variety of different power sources can be utilized. In certain embodiments, the power source can be a battery already found inside the vehicle, such as the car's battery. In other embodiments, a dedicated power source, such as one or more separate batteries, specifically dedicated to the apparatus can be provided. In other embodiments, the braking system could use the car's existing power source that supplies power to the other components of the car that require electricity (e.g., car's central computer, headlights, brake lights, etc.).

In certain embodiments, a process for displaying the amount of braking being applied to a vehicle is provided. The process can include (1) measuring how far the brake pedal has been depressed, such as relative to its original resting position and/or fully depressed state; (2) determining the appropriate number of lights of the light emitting device (e.g., series of programmable LED lights) to illuminate (in certain embodiments, including determining if the lights of the light emitting device should flash and in what intervals); (3) sending the lighting instructions to the lights in the light emitting device; and (4) executing the instruction to be in the on, off and/or flashing state.

Figure 5:
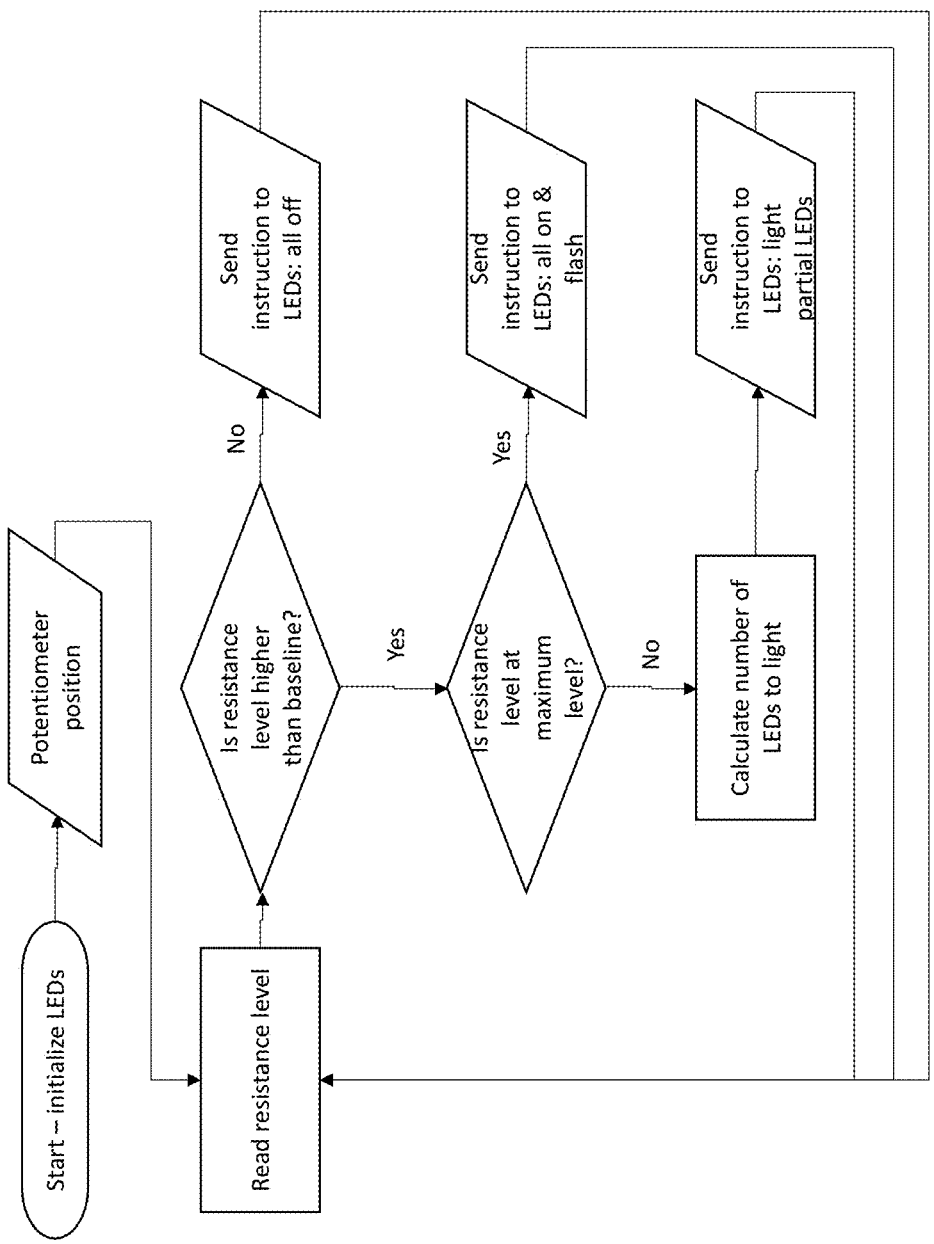
FIG. 5 shows an illustrative embodiment of a program code logic of the microcontroller based on the output of a potentiometer.

FIG. 5 shows an exemplary program code logic within the microcontroller or processor utilizing a potentiometer as the exemplary brake pedal depression measurement device and a series of individually programmable LEDs as the light emitting device. As shown, the program code logic can determine how many of the LED lights to illuminate based upon the resistance within the potentiometer. The microcontroller or processor can begin by reading the resistance of the potentiometer. The range of a resistance provided by a potentiometer can be read from the potentiometer, or as supplied by the manufacturer. The program code within the microcontroller can be set up so that there are ranges of resistance levels (a.k.a. resistance buckets) that correspond to illuminating different numbers of LEDs. If the resistance level is the "baseline" or resistance corresponding to the brake pedal in its resting position, the microcontroller can send an instruction to the LED lights to turn off all of the lights. When the driver presses the brake pedal, the resistance within the potentiometer can increase and when the resistance has increased to be in the next resistance bucket, a subset of LEDs can be illuminated. As the resistance progresses through the subsequent resistance buckets, more LED lights can be lit. When the resistance level has reached the maximum resistance bucket, all of the LEDs can be illuminated. In certain embodiments, all of the LEDs can also flash according to a desired flashing pattern specified by the microcontroller or processor. When the driver releases the brake pedal, and as the potentiometer resistance decreases, the potentiometer can exhibit lower resistance values according to different resistance buckets, and correspondingly lower number of LED lights can be illuminated until all of the LEDs are in the off state when the brake has been fully released.

Figure 6:
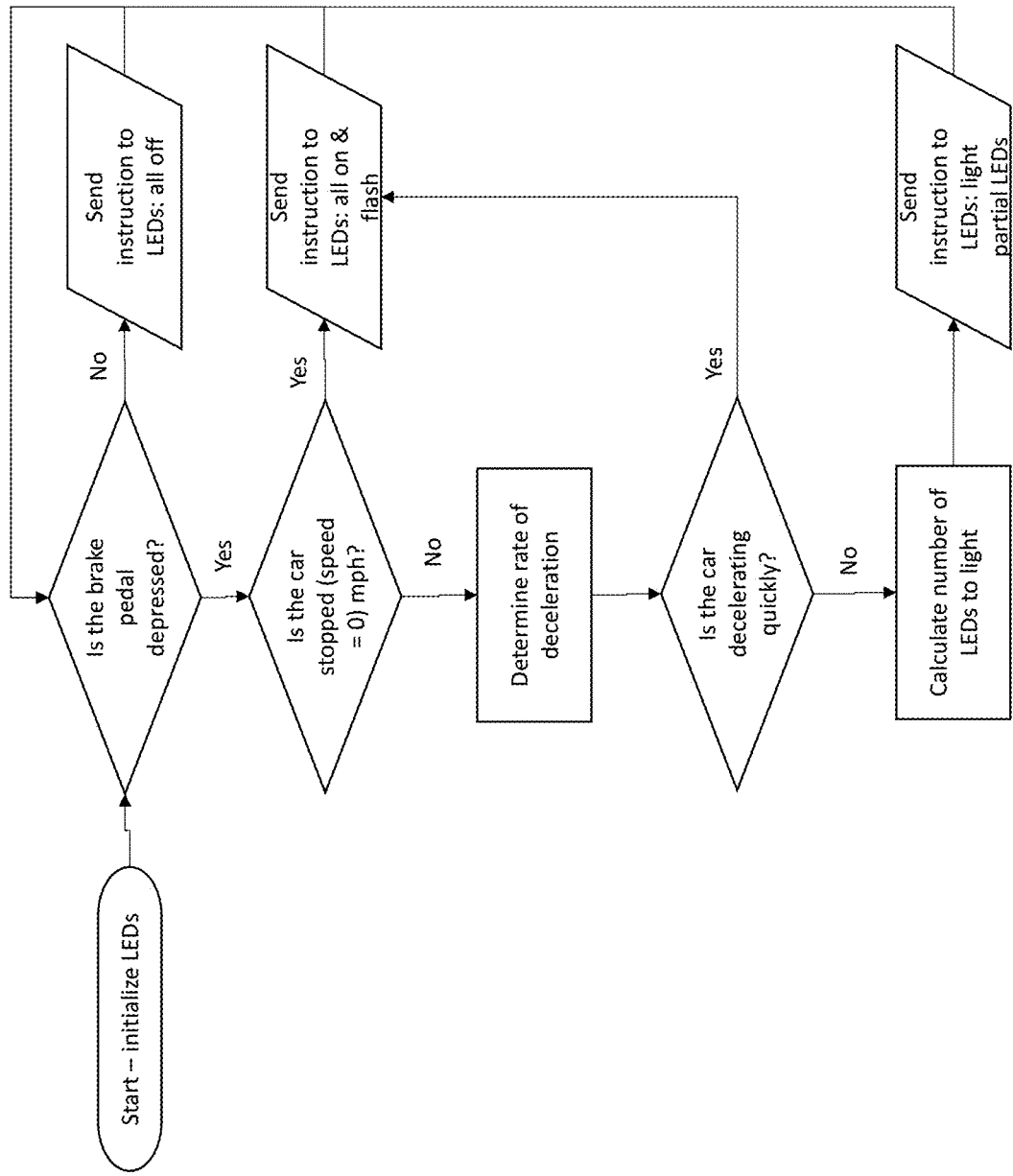
FIG. 6 shows an illustrative embodiment of a program code logic of the microcontroller code based on the current speed of the vehicle and the current rate of deceleration of the vehicle.

In yet another embodiment shown in FIG. 6, the microcontroller or processor can receive one or more inputs from the vehicle's existing computer system: (1) whether the brake pedal is being pressed by the driver; (2) the current speed; and (3) the current rate of deceleration. The program code can first determine if the brake pedal is depressed. If the pedal is not depressed, then the instruction to turn off all of the LED lights can be given. However, if the brake pedal is pressed, the microcontroller or processor can receive the current speed and the current rate of deceleration of the vehicle from the vehicle's existing computer system. Similar to the grouping of the resistance values using a potentiometer, the different rates of deceleration can be grouped into different ranges of deceleration. For example, a low rate of deceleration of about 4 feet/second$^2$ can illuminate a small number of LED lights, whereas a high rate of deceleration of over 20 feet/second$^2$ can illuminate all LED lights.

In another embodiment, the number of illuminated LEDs could depend on the speed of the vehicle. Even if the vehicle's rate of deceleration is low or the brake pedal is not being heavily depressed, if the current speed is below a given threshold (e.g., less than 5 miles an hour), the microprocessor or processor can determine that all of the LEDs must be lit because the vehicle is effectively stopped.

It will be recognized that one or more features of any embodiments disclosed herein may be combined and/or rearranged within the scope of the invention to produce further embodiments that are also within the scope of the invention.

Those skilled in the art will recognize or be able to ascertain using no more than routine experimentation, many equivalents to the specific embodiments of the invention described herein. Such equivalents are also intended to be within the scope of the present invention.

EXAMPLES

The examples provided below facilitate a more complete understanding of the invention. The following examples illustrate exemplary modes of making and practicing the invention. However, the scope of the invention is not limited to specific embodiments disclosed in such examples, which are illustrative only, since alternative methods can be utilized to obtain similar results. A prototype and the illumination pattern of the light emitting device can be seen in FIGS. 7A-7C and FIGS. 8A-8C.

The following components were used to build the proof of concept prototype, but scope of this patent is not limited to using these components. Any other components that perform similar functionality to these are also covered by the art in this patent. Potentiometer: WGCD PlayStation2 joystick for Arduino (Amazon ASIN: B01N59MK0U); Programmable microcontroller: Elango Arduino controller (model number: Mega 2560 UDO); Programmable LED strip: Ada fruit LED stick (Product ID 1426).

A prototype brake pedal was connected to a WGCD PlayStation2 joystick potentiometer such that when the brake pedal is depressed the potentiometer moves and therefore its resistance changes. The potentiometer was also connected to the input pins of an Elango Arduino microcontroller, which continuously read the resistance from the potentiometer. The microcontroller was connected to an Ada fruit LED stick via one of the microcontroller's output pins. Both the programmable LEDs and the microcontroller had an external power source connected to them in order to provide electricity. Appendix I shows the code that was used to illuminate the LED lights, but there are numerous ways to code the similar logic.

In the "resting state" when the brake pedal is not pressed, none of the LED lights are illuminated. When the driver of the vehicle begins to depress the brake pedal, four of the LEDs are illuminated. As the driver continues to depress the pedal, eight of the lights are illuminated and as the brake pedal continues to be further pressed, twelve of the lights are illuminated. When the brake pedal is fully depressed, all of the LED lights are illuminated and the lights flash. As the driver begins to release the brake such that it returns to its resting state, the lights will turn off in the reverse order they were lit.

As will be apparent to one of ordinary skill in the art from a reading of this disclosure, further embodiments of the present invention can be presented in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention. The scope of the invention is as set forth in the appended claims and equivalents thereof, rather than being limited to the examples contained in the foregoing description.

APPENDIX I

Source code for an exemplary embodiment.

```
// Rear Ender Defender Arduino code
// 1/20/18
#include <Adafruit_NeoPixel.h>
#ifdef __AVR__
    #include <avr/power.h>
#endif
// Digital pin for neopixel strip
#define PIN 6
// Code to initialize NeoPixel strip
strip = Adafruit_NeoPixel(60, PIN, NEO_GRB + NEO_KHZ800);
// Variable to store resistance value
int val = 0;
// Code to initialize joystick
const int X_pin = 0; // analog pin connected to X output
void setup( ) {
    strip.begin( );
    strip.show( ); // Initialize all pixels to off
    pinMode(SW_pin, INPUT);
    digitalWrite(SW_pin, HIGH);
}
void loop( ) {
    // Read resistance value from joystick
    val = analogRead(X_pin);
    if (val > 1000)
    {
        // Highest resistance = light all lights and blink
        for (int i=0; i<3; i=i+1)
        {
            strip.setPixelColor(0, strip.Color(255, 0, 0));
            strip.setPixelColor(1, strip.Color(255, 0, 0));
            strip.setPixelColor(2, strip.Color(255, 0, 0));
            strip.setPixelColor(3, strip.Color(255, 0, 0));
            strip.setPixelColor(4, strip.Color(255, 0, 0));
            strip.setPixelColor(5, strip.Color(255, 0, 0));
            strip.setPixelColor(6, strip.Color(255, 0, 0));
            strip.setPixelColor(7, strip.Color(255, 0, 0));
            strip.setPixelColor(8, strip.Color(255, 0, 0));
            strip.setPixelColor(9, strip.Color(255, 0, 0));
            strip.setPixelColor(10, strip.Color(255, 0, 0));
            strip.setPixelColor(11, strip.Color(255, 0, 0));
            strip.setPixelColor(12, strip.Color(255, 0, 0));
            strip.setPixelColor(13, strip.Color(255, 0, 0));
            strip.setPixelColor(14, strip.Color(255, 0, 0));
            strip.setPixelColor(15, strip.Color(255, 0, 0));
```

APPENDIX I-continued

Source code for an exemplary embodiment.

```
        strip.setPixelColor(16, strip.Color(255, 0, 0));
        strip.setPixelColor(17, strip.Color(255, 0, 0));
        strip.setPixelColor(18, strip.Color(255, 0, 0));
        strip.setPixelColor(19, strip.Color(255, 0, 0));
        strip.setPixelColor(20, strip.Color(255, 0, 0));
        strip.setPixelColor(21, strip.Color(255, 0, 0));
        strip.setPixelColor(22, strip.Color(255, 0, 0));
        strip.setPixelColor(23, strip.Color(255, 0, 0));
        strip.show( );
        delay(100);
        if (blinkCounter<5){
            strip.setPixelColor(0, strip.Color(0, 0, 0));
            strip.setPixelColor(1, strip.Color(0, 0, 0));
            strip.setPixelColor(2, strip.Color(0, 0, 0));
            strip.setPixelColor(3, strip.Color(0, 0, 0));
            strip.setPixelColor(4, strip.Color(0, 0, 0));
            strip.setPixelColor(5, strip.Color(0, 0, 0));
            strip.setPixelColor(6, strip.Color(0, 0, 0));
            strip.setPixelColor(7, strip.Color(0, 0, 0));
            strip.setPixelColor(8, strip.Color(0, 0, 0));
            strip.setPixelColor(9, strip.Color(0, 0, 0));
            strip.setPixelColor(10, strip.Color(0, 0, 0));
            strip.setPixelColor(11, strip.Color(0, 0, 0));
            strip.setPixelColor(12, strip.Color(0, 0, 0));
            strip.setPixelColor(13, strip.Color(0, 0, 0));
            strip.setPixelColor(14, strip.Color(0, 0, 0));
            strip.setPixelColor(15, strip.Color(0, 0, 0));
            strip.setPixelColor(16, strip.Color(0, 0, 0));
            strip.setPixelColor(17, strip.Color(0, 0, 0));
            strip.setPixelColor(18, strip.Color(0, 0, 0));
            strip.setPixelColor(19, strip.Color(0, 0, 0));
            strip.setPixelColor(20, strip.Color(0, 0, 0));
            strip.setPixelColor(21, strip.Color(0, 0, 0));
            strip.setPixelColor(22, strip.Color(0, 0, 0));
            strip.setPixelColor(23, strip.Color(0, 0, 0));
            strip.show( );
            delay(50);
        }
        blinkCounter=blinkCounter+1;
    }
}
else if (val > 877)
{
    // Light 20 lights
    strip.setPixelColor(0, strip.Color(0, 0, 0));
    strip.setPixelColor(1, strip.Color(0, 0, 0));
    strip.setPixelColor(2, strip.Color(255, 0, 0));
    strip.setPixelColor(3, strip.Color(255, 0, 0));
    strip.setPixelColor(4, strip.Color(255, 0, 0));
    strip.setPixelColor(5, strip.Color(255, 0, 0));
    strip.setPixelColor(6, strip.Color(255, 0, 0));
    strip.setPixelColor(7, strip.Color(255, 0, 0));
    strip.setPixelColor(8, strip.Color(255, 0, 0));
    strip.setPixelColor(9, strip.Color(255, 0, 0));
    strip.setPixelColor(10, strip.Color(255, 0, 0));
    strip.setPixelColor(11, strip.Color(255, 0, 0));
    strip.setPixelColor(12, strip.Color(255, 0, 0));
    strip.setPixelColor(13, strip.Color(255, 0, 0));
    strip.setPixelColor(14, strip.Color(255, 0, 0));
    strip.setPixelColor(15, strip.Color(255, 0, 0));
    strip.setPixelColor(16, strip.Color(255, 0, 0));
    strip.setPixelColor(17, strip.Color(255, 0, 0));
    strip.setPixelColor(18, strip.Color(255, 0, 0));
    strip.setPixelColor(19, strip.Color(255, 0, 0));
    strip.setPixelColor(20, strip.Color(255, 0, 0));
    strip.setPixelColor(21, strip.Color(255, 0, 0));
    strip.setPixelColor(22, strip.Color(0, 0, 0));
    strip.setPixelColor(23, strip.Color(0, 0, 0));
    strip.show( );
    blinkCounter = 0;
}
else if (val > 804)
{
    // Light 16 lights
    strip.setPixelColor(0, strip.Color(0, 0, 0));
    strip.setPixelColor(1, strip.Color(0, 0, 0));
    strip.setPixelColor(2, strip.Color(0, 0, 0));
    strip.setPixelColor(3, strip.Color(0, 0, 0));
    strip.setPixelColor(4, strip.Color(255,0, 0));
    strip.setPixelColor(5, strip.Color(255, 0, 0));
    strip.setPixelColor(6, strip.Color(255, 0, 0));
    strip.setPixelColor(7, strip.Color(255, 0, 0));
    strip.setPixelColor(8, strip.Color(255, 0, 0));
    strip.setPixelColor(9, strip.Color(255, 0, 0));
    strip.setPixelColor(10, strip.Color(255, 0, 0));
    strip.setPixelColor(11, strip.Color(255, 0, 0));
    strip.setPixelColor(12, strip.Color(255, 0, 0));
    strip.setPixelColor(13, strip.Color(255, 0, 0));
    strip.setPixelColor(14, strip.Color(255, 0, 0));
    strip.setPixelColor(15, strip.Color(255, 0, 0));
    strip.setPixelColor(16, strip.Color(255, 0, 0));
    strip.setPixelColor(17, strip.Color(255, 0, 0));
    strip.setPixelColor(18, strip.Color(255, 0, 0));
    strip.setPixelColor(19, strip.Color(255, 0, 0));
    strip.setPixelColor(20, strip.Color(0, 0, 0));
    strip.setPixelColor(21, strip.Color(0, 0, 0));
    strip.setPixelColor(22, strip.Color(0, 0, 0));
    strip.setPixelColor(23, strip.Color(0, 0, 0));
    strip.show( );
    blinkCounter = 0;
}
else if (val > 731)
{
    // Light 12 lights
    strip.setPixelColor(0, strip.Color(0, 0, 0));
    strip.setPixelColor(1, strip.Color(0, 0, 0));
    strip.setPixelColor(2, strip.Color(0, 0, 0));
    strip.setPixelColor(3, strip.Color(0, 0, 0));
    strip.setPixelColor(4, strip.Color(0,0, 0));
    strip.setPixelColor(5, strip.Color(0, 0, 0));
    strip.setPixelColor(6, strip.Color(255, 0, 0));
    strip.setPixelColor(7, strip.Color(255, 0, 0));
    strip.setPixelColor(8, strip.Color(255, 0, 0));
    strip.setPixelColor(9, strip.Color(255, 0, 0));
    strip.setPixelColor(10, strip.Color(255, 0, 0));
    strip.setPixelColor(11, strip.Color(255, 0, 0));
    strip.setPixelColor(12, strip.Color(255, 0, 0));
    strip.setPixelColor(13, strip.Color(255, 0, 0));
    strip.setPixelColor(14, strip.Color(255, 0, 0));
    strip.setPixelColor(15, strip.Color(255, 0, 0));
    strip.setPixelColor(16, strip.Color(255, 0, 0));
    strip.setPixelColor(17, strip.Color(255, 0, 0));
    strip.setPixelColor(18, strip.Color(0, 0, 0));
    strip.setPixelColor(19, strip.Color(0, 0, 0));
    strip.setPixelColor(20, strip.Color(0, 0, 0));
    strip.setPixelColor(21, strip.Color(0, 0, 0));
    strip.setPixelColor(22, strip.Color(0, 0, 0));
    strip.setPixelColor(23, strip.Color(0, 0, 0));
    strip.show( );
    blinkCounter = 0;
}
else if (val > 658)
{
    // Light 8 lights
    strip.setPixelColor(0, strip.Color(0, 0, 0));
    strip.setPixelColor(1, strip.Color(0, 0, 0));
    strip.setPixelColor(2, strip.Color(0, 0, 0));
    strip.setPixelColor(3, strip.Color(0, 0, 0));
    strip.setPixelColor(4, strip.Color(0,0, 0));
    strip.setPixelColor(5, strip.Color(0, 0, 0));
    strip.setPixelColor(6, strip.Color(0, 0, 0));
    strip.setPixelColor(7, strip.Color(0, 0, 0));
    strip.setPixelColor(8, strip.Color(255, 0, 0));
    strip.setPixelColor(9, strip.Color(255, 0, 0));
    strip.setPixelColor(10, strip.Color(255, 0, 0));
    strip.setPixelColor(11, strip.Color(255, 0, 0));
    strip.setPixelColor(12, strip.Color(255, 0, 0));
    strip.setPixelColor(13, strip.Color(255, 0, 0));
    strip.setPixelColor(14, strip.Color(255, 0, 0));
    strip.setPixelColor(15, strip.Color(255, 0, 0));
    strip.setPixelColor(16, strip.Color(0, 0, 0));
    strip.setPixelColor(17, strip.Color(0, 0, 0));
    strip.setPixelColor(18, strip.Color(0, 0, 0));
    strip.setPixelColor(19, strip.Color(0, 0, 0));
    strip.setPixelColor(20, strip.Color(0, 0, 0));
    strip.setPixelColor(21, strip.Color(0, 0, 0));
```

APPENDIX I-continued

Source code for an exemplary embodiment.

```
        strip.setPixelColor(22, strip.Color(0, 0, 0)) ;
        strip.setPixelColor(23, strip.Color(0, 0, 0));
        strip.show( );
        blinkCounter = 0;
    }
    else if (val > 585)
    {
        // Light 4 lights
        strip.setPixelColor(0, strip.Color(0, 0, 0));
        strip.setPixelColor(1, strip.Color(0, 0, 0));
        strip.setPixelColor(2, strip.Color(0, 0, 0));
        strip.setPixelColor(3, strip.Color(0, 0, 0));
        strip.setPixelColor(4, strip.Color(0,0, 0));
        strip.setPixelColor(5, strip.Color(0, 0, 0));
        strip.setPixelColor(6, strip.Color(0, 0, 0));
        strip.setPixelColor(7, strip.Color(0, 0, 0));
        strip.setPixelColor(8, strip.Color(0, 0, 0));
        strip.setPixelColor(9, strip.Color(0, 0, 0));
        strip.setPixelColor(10, strip.Color(255, 0, 0));
        strip.setPixelColor(11, strip.Color(255, 0, 0));
        strip.setPixelColor(12, strip.Color(255, 0, 0));
        strip.setPixelColor(13, strip.Color(255, 0, 0));
        strip.setPixelColor(14, strip.Color(0, 0, 0));
        strip.setPixelColor(15, strip.Color(0, 0, 0));
        strip.setPixelColor(16, strip.Color(0, 0, 0));
        strip.setPixelColor(17, strip.Color(0, 0, 0));
        strip.setPixelColor(18, strip.Color(0, 0, 0));
        strip.setPixelColor(19, strip.Color(0, 0, 0));
        strip.setPixelColor(20, strip.Color(0, 0, 0));
        strip.setPixelColor(21, strip.Color(0, 0, 0));
        strip.setPixelColor(22, strip.Color(0, 0, 0));
        strip.setPixelColor(23, strip.Color(0, 0, 0));
        strip.show( );
        blinkCounter = 0;
    }
    else
    {
        // Turn off all lights
        strip.setPixelColor(0, strip.Color(0, 0, 0));
        strip.setPixelColor(1, strip.Color(0, 0, 0));
        strip.setPixelColor(2, strip.Color(0, 0, 0));
        strip.setPixelColor(3, strip.Color(0, 0, 0));
        strip.setPixelColor(4, strip.Color(0,0, 0));
        strip.setPixelColor(5, strip.Color(0, 0, 0));
        strip.setPixelColor(6, strip.Color(0, 0, 0));
        strip.setPixelColor(7, strip.Color(0, 0, 0));
        strip.setPixelColor(8, strip.Color(0, 0, 0));
        strip.setPixelColor(9, strip.Color(0, 0, 0));
        strip.setPixelColor(10, strip.Color(0, 0, 0));
        strip.setPixelColor(11, strip.Color(0, 0, 0));
        strip.setPixelColor(12, strip.Color(0, 0, 0));
        strip.setPixelColor(13, strip.Color(0, 0, 0));
        strip.setPixelColor(14, strip.Color(0, 0, 0));
        strip.setPixelColor(15, strip.Color(0, 0, 0));
        strip.setPixelColor(16, strip.Color(0, 0, 0));
        strip.setPixelColor(17, strip.Color(0, 0, 0));
        strip.setPixelColor(18, strip.Color(0, 0, 0));
        strip.setPixelColor(19, strip.Color(0, 0, 0));
        strip.setPixelColor(20, strip.Color(0, 0, 0));
        strip.setPixelColor(21, strip.Color(0, 0, 0));
        strip.setPixelColor(22, strip.Color(0, 0, 0));
        strip.setPixelColor(23, strip.Color(0, 0, 0));
        strip.show( );
        blinkCounter = 0;
    }
}
```

What is claimed is:

1. A braking system comprising:

(a) a brake pedal;

(b) a brake pedal depression measurement device operatively connected to a brake arm;

(c) a light emitting device comprising a plurality of programmable lights;

(d) a microcontroller operatively connected to the light emitting device and the brake pedal depression measurement device; and (e) a power source operatively connected to the microcontroller and the light emitting device;

wherein the microcontroller is configured to receive an input from the brake pedal depression measurement device regarding the braking condition and determine the specific one or more programmable lights to be illuminated in response thereto; and wherein the microcontroller is configured to progressively illuminate the specific one or more of the plurality of programmable lights in different shades of red, amber or other colors and/or the microcontroller is configured to flash the plurality of programmable lights to spell out "STOP".

2. The braking system of claim 1, wherein the light emitting device comprises a plurality of programmable light emitting diodes.

3. The braking system of claim 1, wherein the brake pedal depression measurement device is a potentiometer.

4. The braking system of claim 3, wherein the microcontroller receives an electrical resistance from the potentiometer as the input.

5. The braking system of claim 3, wherein the output of the potentiometer is divided into different electrical resistance buckets indicative of the amount of braking pressure applied to the brake pedal.

6. A braking system comprising:

(a) a brake pedal;

(b) a light emitting device comprising a plurality of programmable lights;

(c) a microcontroller operatively connected to the light emitting device and the brake pedal; and (d) a power source operatively connected to the microcontroller and the light emitting device;

wherein the microcontroller is configured to:

(i) receive information regarding (1) whether the brake pedal has been depressed, (2) the current speed of the vehicle, and (3) the current rate of deceleration of the vehicle; and (ii) provide instructions to the light emitting device to progressively illuminate specific one or more of the plurality of programmable lights in different shades of red, amber or other colors depending on predetermined conditions of the current speed of the vehicle and the current rate of deceleration of the vehicle when the brake pedal has been depressed;

wherein the plurality of programmable lights is configured to flash and spell out "STOP" when maximum braking condition is exhibited.

7. The braking system of claim 6, wherein the microcontroller is configured to provide instruction to the light emitting device to illuminate all of the plurality of the programmable lights if the current speed of the vehicle is near zero when the brake pedal has been depressed.

8. The braking system of claim 6, wherein the microcontroller is configured to provide instruction to the light emitting device to illuminate all of the plurality of the programmable lights if the current speed of the vehicle is below a predetermined speed value or if the current rate of deceleration is above a predetermined deceleration rate value when the brake pedal has been depressed.

9. The braking system of claim 6, wherein the microcontroller is configured to provide instruction to the light emitting device to illuminate specific one or more of the plurality of the programmable lights when the current speed of the vehicle is above a predetermined speed value or the current rate of deceleration is below a predetermined deceleration rate value when the brake pedal has been depressed.

10. The braking system of claim 6, wherein the light emitting device comprises a plurality of programmable light emitting diodes.

11. A braking system comprising:
 (a) a brake pedal;
 (b) a light emitting device comprising a plurality of programmable lights;
 (c) a microcontroller operatively connected to the light emitting device and the brake pedal; and
 (d) a power source operatively connected to the microcontroller and the light emitting device;
 wherein the microcontroller is configured to:
  (i) receive information regarding (1) whether the brake pedal has been depressed, (2) the current speed of the vehicle, and (3) the current rate of deceleration of the vehicle; and
  (ii) provide instructions to the light emitting device to progressively illuminate specific one or more of the plurality of programmable lights in different shades of red, amber or other colors, depending on predetermined conditions of the current speed of the vehicle and the current rate of deceleration of the vehicle when the brake pedal has been depressed;
 wherein the plurality of programmable lights is configured to flash and spell out "STOP" when maximum braking condition is exhibited; and
 wherein the microcontroller is further configured to progressively turn off specific one or more of the plurality of programmable lights when the current speed of the vehicle is above a predetermined speed value or the current rate of deceleration is below a predetermined deceleration rate value when the brake pedal has been depressed.

12. The braking system of claim 11, wherein the microcontroller is configured to provide instruction to the light emitting device to illuminate all of the plurality of the programmable lights if the current speed of the vehicle is near zero when the brake pedal has been depressed.

13. The braking system of claim 11, wherein the microcontroller is configured to provide instruction to the light emitting device to illuminate all of the plurality of programmable lights if the current speed of the vehicle is below a predetermined speed value or if the current rate of deceleration is above a predetermined deceleration rate value when the brake pedal has been depressed.

14. The braking system of claim 11, wherein the microcontroller is configured to provide instruction to the light emitting device to illuminate specific one or more of the plurality of the programmable lights when the current speed of the vehicle is above a predetermined speed value or the current rate of deceleration is below a predetermined deceleration rate value when the brake pedal has been depressed.

15. The braking system of claim 11, wherein the light emitting device comprises a plurality of programmable light emitting diodes.

* * * * *